May 4, 1943.                F. RIEBER                2,318,098
PHONOGRAPH APPARATUS
Filed April 28, 1941                8 Sheets-Sheet 2
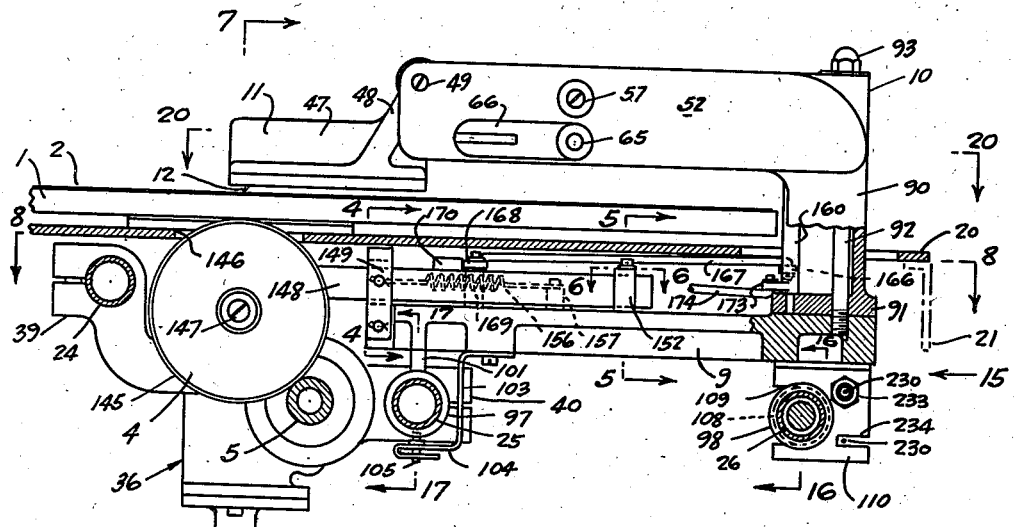
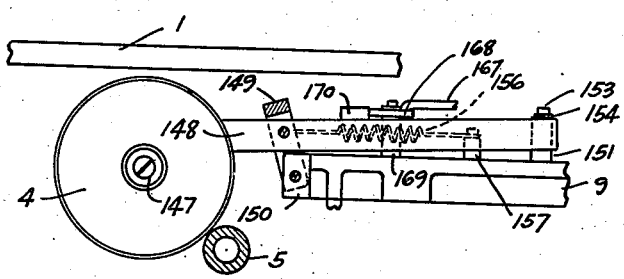
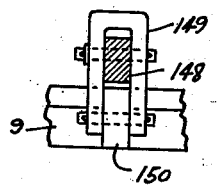
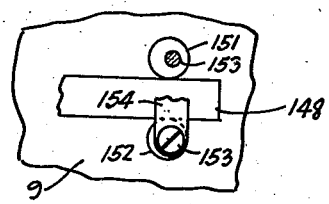
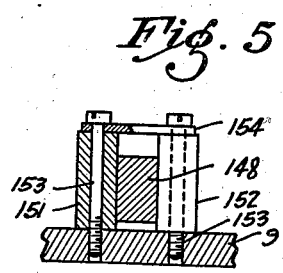
INVENTOR
Frank Rieber
BY John Flam
ATTORNEY May 4, 1943.                F. RIEBER                2,318,098
                      PHONOGRAPH APPARATUS
                    Filed April 28, 1941            8 Sheets-Sheet 3
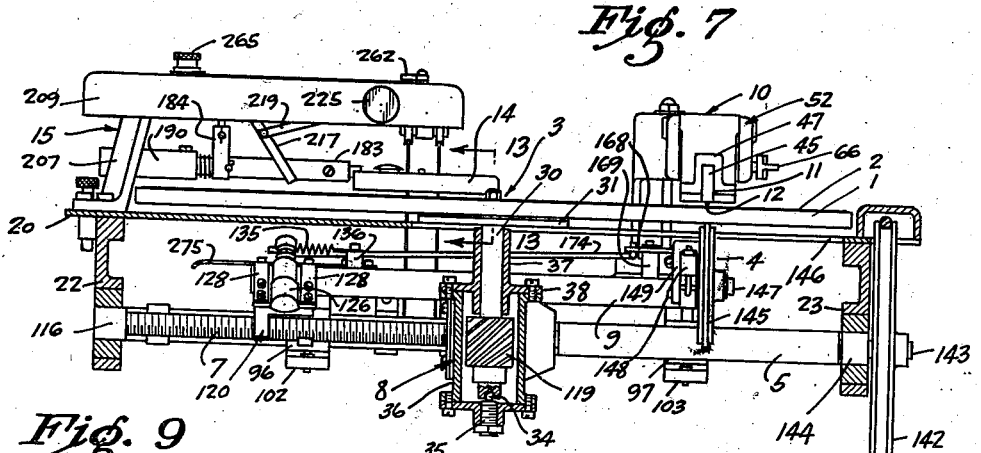
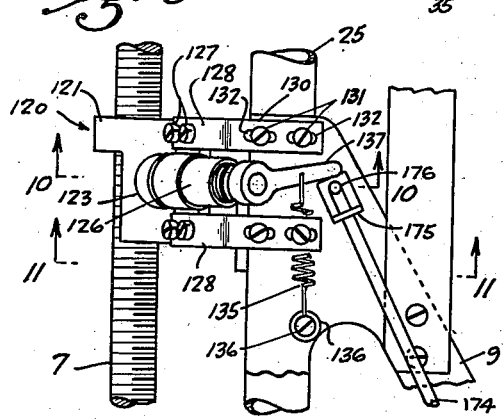
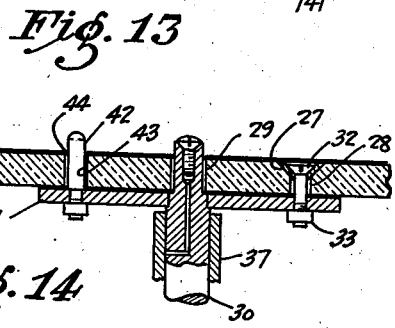
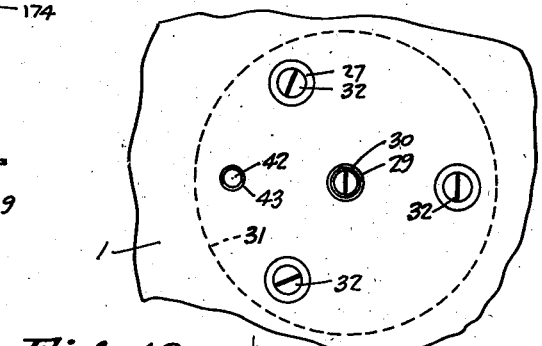
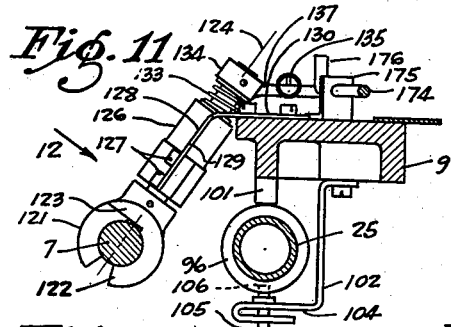
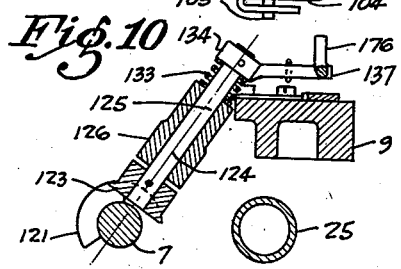
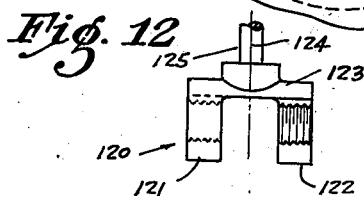
INVENTOR
Frank Rieber
BY John Flam
ATTORNEY

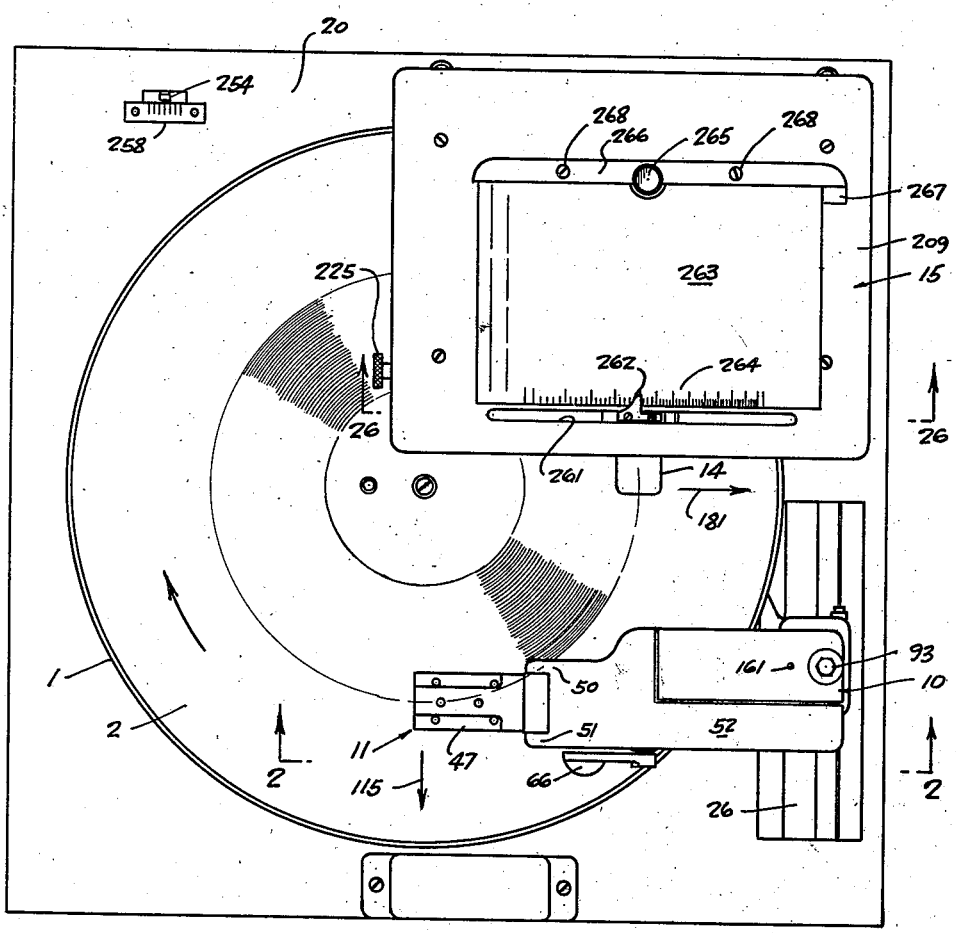
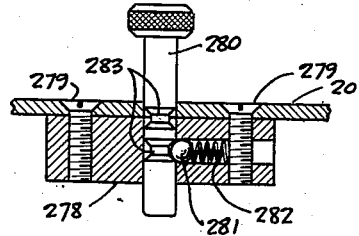
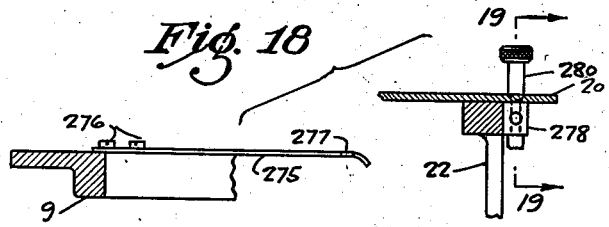

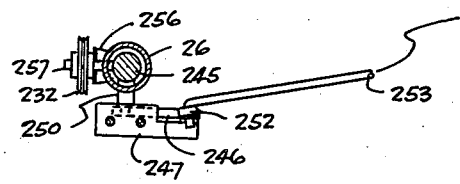
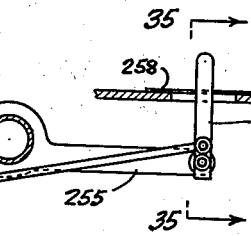
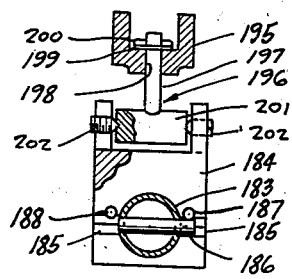
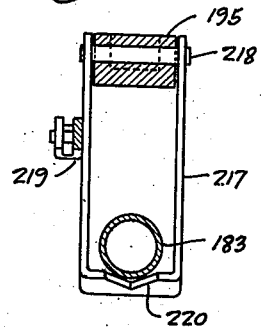
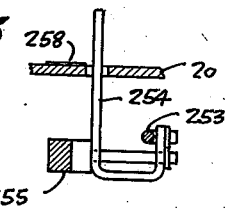
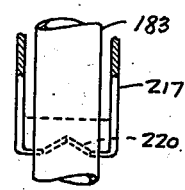
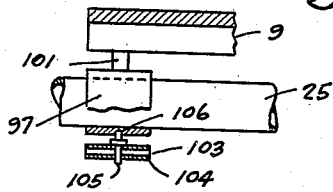
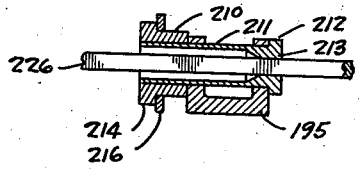
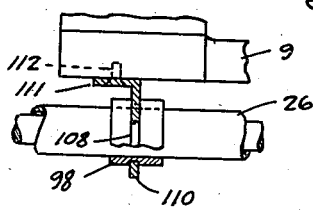

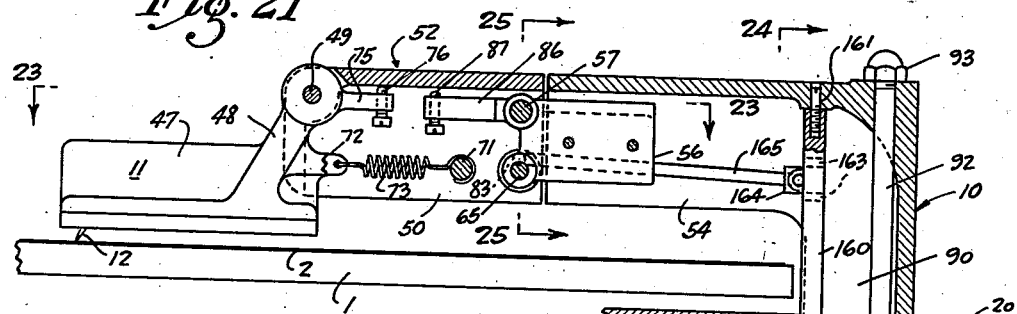
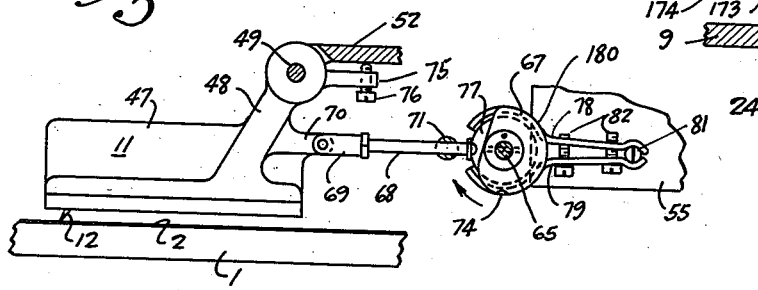
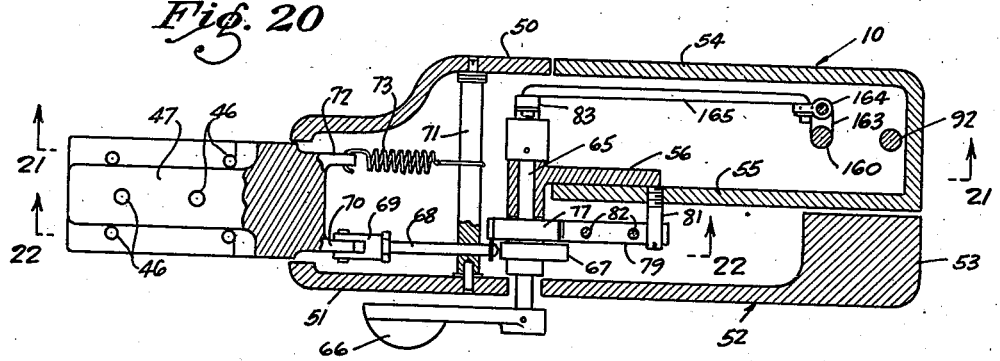
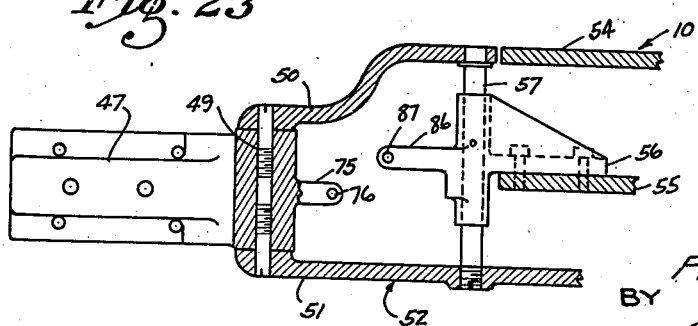

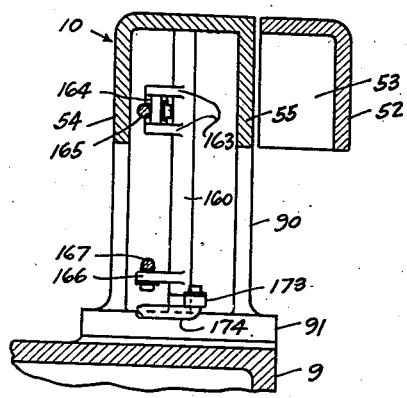
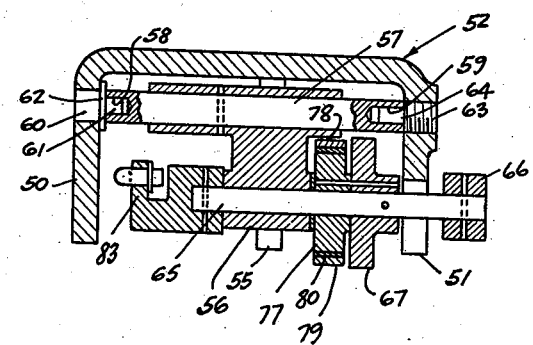
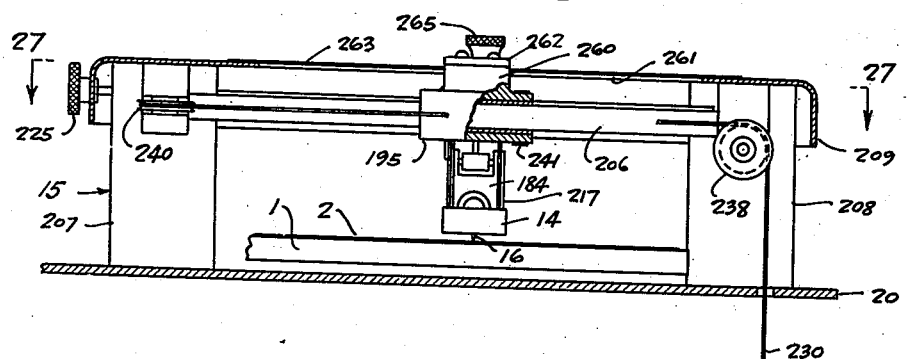
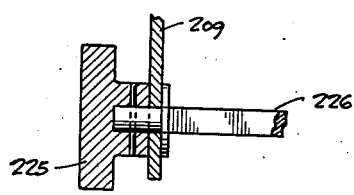
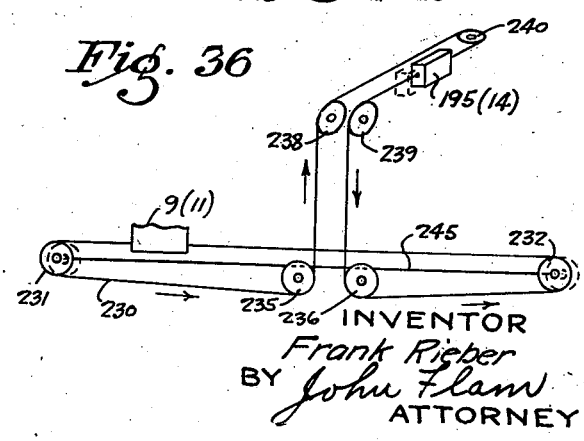

May 4, 1943.　　　　　F. RIEBER　　　　2,318,098
PHONOGRAPH APPARATUS
Filed April 28, 1941　　　　8 Sheets-Sheet 8

INVENTOR
Frank Rieber
BY John Flam
ATTORNEY

Patented May 4, 1943

2,318,098

UNITED STATES PATENT OFFICE 2,318,098

PHONOGRAPH APPARATUS

Frank Rieber, Los Angeles, Calif., assignor to Memovox, Inc., Beverly Hills, Calif., a corporation of Ohio Application April 28, 1941, Serial No. 390,690

21 Claims. (Cl. 274—9)

This invention relates to apparatus for the recording and reproduction of sound, and especially to apparatus of the type including a recorder adapted to form a record groove on a suitable blank, as well as a reproducer adapted for playing back the recorded material directly after recordation.

This application is a continuation in part of an application filed in the name of Frank Rieber on November 27, 1939, Serial No. 306,244, now Patent No. 2,293,217 issued Aug. 18, 1942, and entitled "Phonograph apparatus."

Such apparatus is in general well known. It is one of the objects of this invention to provide improved apparatus of this character.

It is preferred to use for the blank on which the record is formed, a thin disc of material which may be readily embossed by the recording stylus. Thus, it is necessary to provide mechanism to cause the recording stylus to be positively traversed across the record surface, as the recording progresses. Due to the shallow depth of such a record groove, it is also desirable to cause the reproducing stylus to be positively traversed across the record surface.

It is another object of this invention to interlink the motion of the reproducer with that of the recorder in a simple and effective manner, and further to provide an improved arrangement for adjusting the relative positions of the recorder and reproducer with respect to the record groove. In this way the reproducer may be so adjusted as to be in position to play back the immediately preceding recorded matter whenever desired, without the necessity of subsequent adjustments.

The recorder is commonly arranged to be positively traversed over the record disc while the turntable is rotated, as by a feed screw mechanism.

In order to accomplish this result, a feed nut is provided that is adapted to be moved into and out of engagement with the threads of the feed screw. It is still another object of this invention to provide an arrangement whereby any slight misalinement of the axis of the feed screw or the like will have no deleterious effect on the drive, the nut remaining in proper operative relation without binding.

It is necessary, incident to the operation of the machine, to lift the recorder out of contact with the record and sometimes to alter the position of the recorder relative to the record, as well as to return the recorder to starting position after reaching the end of a record. This involves disconnecting the feed mechanism as well as the turntable drive. It is still another object of this invention to make it possible to lift the recorder as desired; and optionally with the lifting of the recorder, either to disengage the feed mechanism as well as to bring the turntable drive mechanism to inactive position by the aid of a common control member; or to allow the feed mechanism to remain engaged and the drive mechanism to remain active. Thus, the machine may be arranged for play-back, or the recorder and reproducer may be moved to any desired position relative the record, for example, to a starting position on a new record blank.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Figure 1 is a top plan view of a phonograph incorporating the invention;

Fig. 2 is a sectional view on an enlarged scale, partly broken away, as seen on plane 2—2 of Fig. 1;

Fig. 3 is a view of a fragment of Fig. 2 showing an alternative position of certain parts of the mechanism;

Figs. 4, 5, 6, 7 and 8 are sectional views taken along correspondingly numbered planes of Fig. 2;

Fig. 9 is an enlarged detail view of a portion of Fig. 8, showing the feed nut;

Figs. 10 and 11 are sectional views as seen on correspondingly numbered planes of Fig. 9;

Fig. 12 is a side elevation of the feed nut, as seen in the direction of the arrow 12 of Fig. 11;

Fig. 13 is a detail section as seen on plane 13—13 of Fig. 7;

Fig. 14 is a plan view of the detail shown in Fig. 13;

Figs. 16 and 17 are detail sections as seen on correspondingly numbered planes of Fig. 2;

Fig. 18 is a fragmentary detail section as seen on plane 18—18 of Fig. 8;

Fig. 19 is a section on an enlarged scale as seen in plane 19—19 of Fig. 18;

Fig. 20 is a detail section as seen on plane 20—20 of Fig. 2;

Figs. 21 and 22 are sections as seen on correspondingly numbered planes of Fig. 20;

Figs. 23, 24 and 25 are sections as seen on correspondingly numbered planes of Fig. 21;

Fig. 26 is a detail section as seen on plane 26—26 of Fig. 1;

Figs. 28 and 29 are sections on an enlarged scale as seen on correspondingly numbered planes of Fig. 27;

Figs. 30, 31, 32 and 33 are detail sections as seen on correspondingly numbered planes of Fig. 28;

Fig. 34 is an elevation as seen in the direction of arrow 34 of Fig. 8, certain parts being omitted for clarity as well as to reduce the size of the figure;

Fig. 35 is a detail section as seen on plane 35—35 of Fig. 34; and

Fig. 36 is a diagram illustrating an adjusting operation of the mechanism.

Figure 8:
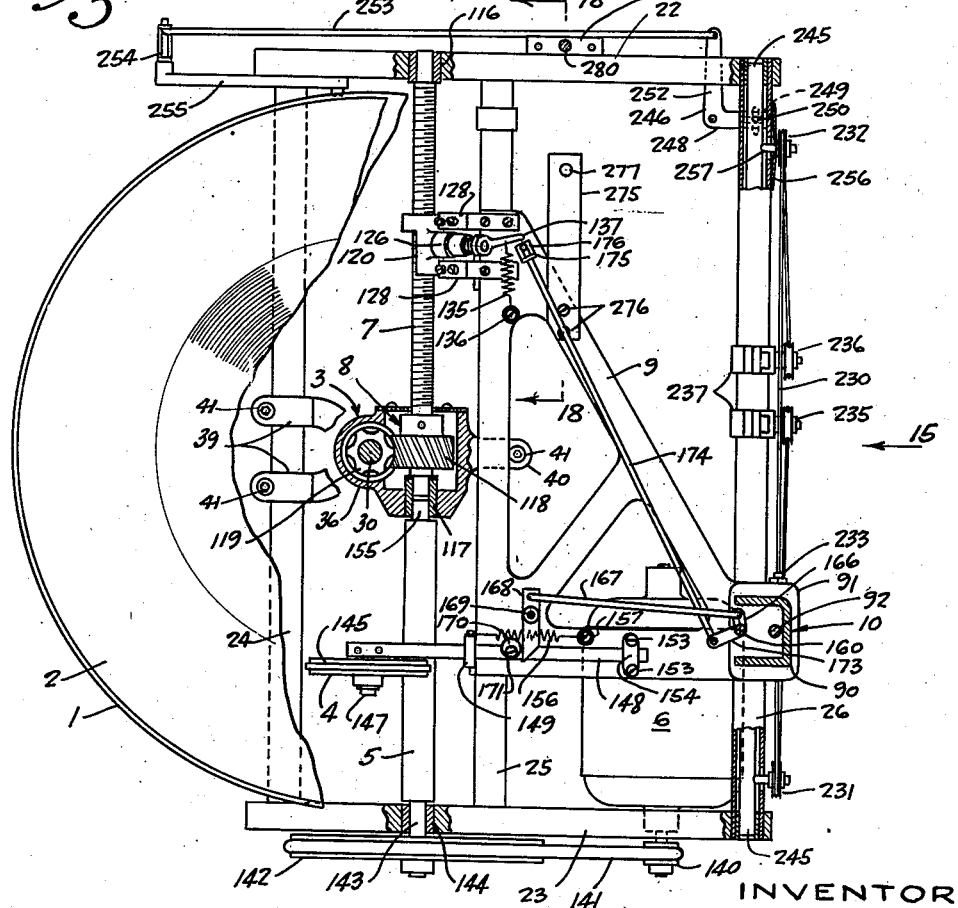

The phonograph apparatus is provided with a turntable adapted to carry a record receiving blank 2 (Figs. 1, 2, 8) and supported for rotation about a vertical axis by means of a spindle mechanism 3 (Fig. 7). Rotation is imparted to turntable 1 by means of a floating puck or idler 4 (Figs. 2, 3, 7, 8) resiliently urged into frictional engagement with lower face of the turntable 1 and the surface of an elongated driving roller 5, driven by any suitable source of power, such as a small electric motor 6 (Fig. 8). Rotation of the turntable 1 serves to drive a feed screw 7 (Fig. 8) through suitable gearing 8, the rotation of the feed screw causing a slidably supported frame or carriage 9 to move transversely with respect to the turntable 1. Frame 9 by means of arm 10 (Figs. 1, 2, 21, 22, 23) carries the recorder 11 (see particularly Fig. 2), which may be preferably an electrically operated type recording head with a stylus 12 which bears upon the record blank 2. The record 11 and frame 9 are so arranged that the stylus 12 moves across the record in a substantially radial direction.

The idler or puck 4 is so carried by frame 9 that it remains in fixed lateral relationship with stylus 12. Thus, as stylus 12 traverses record 2, due to lateral motion of frame 1, the speed of rotation of the record 2 and the turntable 1 progressively changes due to the movement of idler 4 toward or away from the axis of the turntable 1. In this way, a substantially constant linear speed of the record 2 past the recording stylus 12 is provided.

The reproducer 14 (Figs. 1, 7, 26, 27, 28) may likewise be preferably an electrical type head, arranged for radial movement across the record surface at some convenient angle with the path of the recorder head 11. The reproducer head 14 is supported by frame 15 (Figs. 27, 28), its stylus 16 engaging the surface of record 2. Reproducer 14 is connected with frame 9 so that it moves simultaneously with recorder 11, this connecting means being so arranged that the reproducer follows the recorder in the record groove with a small adjustable amount of lag. Means are provided for optionally lifting either stylus out of contact with the record, as well as disconnecting frame 9 from the feed screw, and stopping rotation of the turntable 1.

As clearly shown in Figs. 1, 2, 7 and 8, the entire apparatus is secured to a rectangular deck plate 20, which may be supported in any convenient manner, as for example, by supporting members extending beneath opposite sides of the plate, one of such members being indicated by 21 in Fig. 2. Secured to plate 20 beneath opposite end edges thereof by any suitable means are frame members 22 and 23 (see particularly Figs. 8 and 15). Tubular members 24, 25 and 26 extend between frames 22 and 23, the ends of these members being secured in the frames 22 and 23 in any convenient manner.

These members 24, 25 and 26 serve to support various parts of the mechanism.

As best shown in Figs. 7, 13 and 14, the turntable 1 may be secured to the spindle proper 30 of spindle mechanism 3 as by being attached to a plate 31 on spindle 30 by a plurality of countersunk head screws 32 provided with lock nuts 33. Spindle 30 is supported at its lower end on a single ball 34 forming a thrust bearing and resting on an adjustable plug 35 in the bottom of a housing 36. Spindle 30 is radially guided by a long bearing sleeve 37 formed in the top cover 38 of a housing 36. This housing is seen to best advantage in Figs. 2 and 8. Housing 36 is secured to tubular members 24 and 25 by means of split arms 39 and 40 (see Figs. 2 and 8) through which members 24, 25 respectively pass. Set screws 41 serve to clamp the arms about their respective supports.

The record member 2 may be of the form described in a prior application filed in the name of Frank Rieber, on September 19, 1939, Serial No. 295,613, and entitled "Sound record carrier." Since such a record may be very thin, having a thickness of the order of .015", it is important that the record supporting surface of the turntable 1 be truly flat. Further, the method of driving requires that the under side of the table be not only truly plane, but normal to the axis of revolution. Such a turntable should also have considerable mass. A convenient material enabling such a table 1 to be formed with a minimum amount of machining is plate glass of suitable thickness. The opposite sides of this are substantially truly plane and in exact parallelism.

A hole 29 (Fig. 13) is provided in the center of turntable 1 to accommodate the upper end of spindle 30, and holes 28 radially spaced from the center are provided for screws 32. Holes 28 are counter sunk to permit lead washers 27 to be inserted under the heads of screws 32. By this means, the table is securely fastened to the spindle 30 without danger of chipping or cracking. A pin 42 is also provided in plate 31 extending upwardly through a hole 43 in the turntable 1 to engage a suitable opening 44 in record 2, for ensuring that the record 2 rotates with turntable 1. This turntable construction is shown and claimed in a copending application filed in the name of George P. Brubaker on July 5, 1941, entitled "Phonograph turntable" and bearing Serial No. 401,139, and assigned to the same assignee as the present case.

Before proceeding with a detailed description of the various interlocks and mechanical controls, the description of the recorder head 11 is in order.

As shown, the recorder 11 is of a conventional electrical type and includes a casing 45 (Figs. 1, 2, 7, 20, 21, 22, 23) enclosing the actuating mechanism from which stylus 12 projects. Casing 45 is suitably secured as by screws 46 in arm 47 which is carried by the arm 10 on frame 9 (see Figs. 2 and 7). Referring particularly to Figs. 2 and 20–23, arm 47 has an upwardly extending backwardly inclined portion 48 carrying a supporting pivot pin 49 in its upper portion. The axis of this pin is substantially parallel with the record surface. The outer ends of pin 49 engage opposite cheeks or legs 50, 51 of a second arm 52 of inverted U section, pivotally supported in the outer end of arm 10. The leg 51 extends backwardly along the side of arm 10 and terminates in a counterweight 53.

The other arm 50 terminates adjacent the outer end of leg 54 of arm 10, which is also of inverted U-section. Leg 55 of arm 10 (Fig. 20) is thus disposed between leg 54 and leg 51 of arm 52, and has a bearing bracket 56 attached adjacent its outer end. The upper end of bracket 56 has a pin 57 fixed therein, which pivotally carries arm 52. The ends of pin 57 are provided with bores 58, 59 (see Fig. 25). Leg 50 or arm 52 has a pintle member 60 with a portion 61 of reduced diameter engaging bore 58. A wear plate or washer 62 may be interposed between the end of pin 57 and the cooperating limiting surface of member 60. A similar pintle member 63 is threadedly mounted in leg 51 and has a reduced portion 64 engaging bore 59. By this arrangement it is possible to prevent any lateral movement between arm 52 and arm 10. Pin 49 may be similarly arranged to prevent lateral movement between arms 47 and 52.

The lower end of bracket 56 rotatably carries a shaft 65 (Figs. 20, 21, 22, 25). This shaft has a small operating or thumb lever 66 at its outer end.

A cam 67 (Fig. 22) is pinned on shaft 65 and is adapted to engage a push rod 68 pivotally connected as by a clevis 69 to an ear 70 on arm 47. Rod 68 is guided by passing through a supporting rod 71 extending across the rear of arm 52 and pivoted in legs 50 and 51.

A second ear 72 on arm 47 receives one end of a tension spring 73, the other end engaging the rod 71. A stop arm 75 extends rearwardly from the upper end of arm 48 and carries a screw 76 adapted to engage the inside upper surface of arm 52 as arm 47 is moved by spring 73, thus limiting the movement of arm 47.

With all parts in their normal operating position as shown in the drawings, arms 47 and 52 swing as a unit about pivot 57, stylus 12 contacting the surface of record 2, the counterbalance 53 serving to prevent the pressure of contact being too great. Under these conditions, push rod 68 is clear of cam 67.

If it is desired to raise stylus 12 above the record surface, cam 67 is turned 90° clockwise by means of handle 66, bringing the high part of cam 67 into contact with rod 68 and swinging arm 47 upwardly about pivot 49 against the tension of spring 73. A depression 74 is formed in the surface of cam 67 adapted to be engaged by rod 68 when the cam has been rotated through 90°, serving to indicate to the operator that the cam has been turned a proper distance and also to act as a detent to maintain the cam in this position as long as desired.

A small brake drum 77 (Figs. 20, 21, 25) is also mounted on shaft 65 to rotate therewith, and is embraced by a pair of spring fingers 78, 79 carrying appropriate frictional material 80. The opposite ends of fingers 78, 79 engage a stud 81 fixed in wall 55 to prevent the fingers rotating with the drum 77. Screws 82 are provided to adjust the frictional grip of fingers 78, 79 on the drum 77. This brake arrangement is to provide a restraint on shaft 65 against undesired movement. A crank arm 83 is provided on the inner end of shaft 65 for a purpose to be later described. To support arm 52 while it is not supported by the stylus 12 bracket 56 (Figs. 21, 23) is provided with a forwardly extending arm 86, having a screw 87 at its outer end forming an adjustable stop and adapted to engage the upper inner surface of arm 52, after it has moved downwardly a short distance.

As previously mentioned, arm 10 is carried by the carriage structure 9. Thus (see Figs. 2, 8 and 21) the arm 10 includes a vertical column-like portion 90 terminating in a foot 91 which rests on the carriage 9. A long stud 92 passes downwardly through column 90 and threadedly engages carriage 9, a cap nut 93 serving to secure the arm 10 on the carriage. Suitable dowel pins (not shown) are provided to prevent the arm 10 rotating about the stud 92 as a pivot.

The carriage 9 is of a triangular or A-shaped form as shown in Fig. 8 and is slidably supported at each of its extremities on the tubular members 25, 26. Thus, each end of frame 9 adjacent member 25 is supported on a short bushing 96, 97 as shown in Figs. 2, 7, 11 and 17, slidable on the tube 25. Similarly the corner of frame 9 which supports column 90 and arm 10 is supported on bushing 98, slidable on tube 26 (see Figs. 2 and 16). These bushings are preferably of self-lubricating bearing material, such as "Oilite" bronze.

To provide for easy assembly, tube 25 is made to serve as a guide for the movement of the frame 9, as well as to support it, whereas tube 26 merely acts as a support. Frame 9 is provided with short depending lugs 100, 101 resting respectively on bushings 96, 97 as well as spring fingers 102 and 103 each having a horizontal portion 104 carrying a pin 105 engaging a suitable opening 106 in the bottom of bushing 96 or 97 as the case may be. Thus frame 9 is constrained to axial movement with respect to the tubular member 25.

Bushing 98 is provided with a circumferential groove 108 arranged to fit closely between the upper and lower surfaces of an opening 109 formed in a member 110 (Figs. 2 and 16) depending from that portion of carriage 9 adjacent the tube 26. Member 110 may conveniently have a horizontal extension 111 by which it is secured to carriage 9, as with screws, one of which is shown at 112. By this arrangement, the relationship between the tubes 25 and 26 and the supporting surfaces on carriage 9 need not be accurately maintained.

The mechanism for advancing carriage 9 as the recording progresses will now be described in detail. Due to the thinness of the record 2 which it is intended to use, it is preferable to have the recording proceed from near the center toward the periphery of the record 2 to ensure against buckling (in the direction indicated by arrow 115, Fig. 1).

As clearly shown in Fig. 8, lead screw 7 extends from near the spindle structure 3 to frame 22. One end of the lead screw 7 is rotatably supported in a suitable bushing 116 which may be "Oilite" bronze, in frame 22, the other end being supported in a similar bushing 117 in the housing 36.

Mounted on lead screw 7 near one end thereof so as to be disposed within housing 36 is a gear wheel 118 having spiral teeth adapted to engage the teeth of a cooperating spiral pinion 119 secured on spindle 30. Accordingly, the lead screw 7 is driven by the turntable spindle, and the angular motion of screw 7 is at all times proportional to the angular motion of the turntable 1. By appropriate choice of the pitch of the threads on lead screw 7 and of the ratio between gears 118, 119, the pitch of the grooves formed on record 2 may be of any desired value. Further, by altering the direction of rotation of the lead screw 7, or of the screw threads on the lead screw, the recording could be formed from the periphery of the record inwardly.

As previously pointed out, rotation of the lead screw produces a corresponding movement of the recorder 11. This is accomplished by the aid of a feed nut 120 carried by the carriage or frame 9 and best shown in Figs. 9–12.

Thus, the nut 120 has a pair of interrupted, internally threaded and axially spaced bands 121 and 122, joined by a yoke 123. Bands 121 and 122 occupy oppositely disposed angular portions of a complete circumference, so as to engage the threads of lead screw 7 on diametrically opposite portions thereof. In this way a rotation of yoke 123 about an axis 124 radial to screw 7 serves either to engage or disengage the threads of bands 121 and 122 with or from the threads of screw 7. At the same time, the force exerted by screw 7 to move frame 9 has no tendency to force nut 120 out of engagement with the screw threads.

In order to permit such rotation, as well as to connect the nut 120 operatively to carriage 9 so that movement of the nut 120 will advance the carriage, a shaft 125 is fastened to yoke 123. Shaft 125 is supported for rotation about axis 124 by a guide 126. Guide 126 is secured by screws 127 to flat supporting springs 128 on opposite sides of the guide. Springs 128 have slopping portions 129 with the same inclination as axis 124 terminating in horizontal portions 130 secured to the top of carriage 9, as by screws 131. For purposes of adjustment, the portions 130 may have slotted holes 132 to receive screws 131.

Shaft 125 is also axially movable in guide 126, to permit the nut 120 to accurately accommodate itself to screw 7. Further, a compression spring 133 surrounding shaft 125 is confined between the top of guide 126 and hub 134 of a crank arm 137 secured to the upper end of shaft 125, to ensure proper engagement between the threads of nut 120 and of lead screw 7.

Shaft 125 is resiliently urged about its axis 124 to move the interrupted bands 121 and 122 into engagement with lead screw 7. This may be accomplished for example by the aid of a tension spring 135, one end of which is secured to crank arm 137, the other end being anchored to a post 136 on carriage 9.

When it is desired to disengage the nut 120 from screw 7, the shaft 125 is turned counterclockwise through a small angle, as viewed from the top. The means for accomplishing this will be described hereinafter. It is to be noted that by virtue of the resilient supporting elements 128, and the freedom of motion of the supporting shaft 125 permitted by springs 133 and 135, the nut 120 can follow accurately the threads on screw 7, even though there be some misalinement or even a slight bending of the screw.

The mechanism for rotating the turntable 1 will now be described (see Figs. 2, 3, 7, 8 and 9). As previously mentioned the source of power for this rotation may be an electric motor 6 (Fig. 8). The shaft of motor 6 carries a small pulley 140 connected by belt 141 to a large pulley 142 mounted on one end of shaft 143 which shaft carries drum 5. Shaft 143 is rotatably supported in frame 23 by a suitable bushing 144 which may be self-lubricating material, such as "Oilite"

bronze. The other end 155 of shaft 143 is journalled in the bushing 117 supported by housing 36. The lead screw 7 and shaft 143 together with driving roller 5 are coaxial. The idler 4 is in driving relation with roller 5 (which may be of metal) as well as with the underside of table 1. Idler 4 may have a resilient rim 145 of rubber or other suitable material. An opening 146 is formed in plate 20 to permit the idler 4 to engage the underside of table 1.

As will be apparent from a consideration of Fig. 2, the idler or puck 4 serves to transmit rotation from roller 5 to table 1 when it is disposed in the position shown. This idler 4 is mounted on carriage 9, so that as the carriage moves laterally, the idler 4 contacts the table 1 at a variable radius. Furthermore, as clearly shown in Fig. 7, the idler 4 engages the turntable 1 immediately below the recording stylus 12. Since the peripheral speed of the idler 4 is always the same as the peripheral speed of roller 5 which is constant, it follows that the linear speed of the turntable at the point of engagement with the idler, and hence the linear speed of the record past the recording stylus 12 is also constant. This speed may be chosen to be of the order of six inches per second, as referred to in the prior application relating to the record, hereinbefore identified.

The idler 4 is freely rotatable on stub shaft 147 which is secured on arm 148, slidable with respect to frame 9. Thus arm 148 is pivoted in an inverted U-shaped link 149 which in turn is pivotally attached to a lug 150 on frame 9 (see Fig. 4). The rear end of bar 148 is slidable between a pair of cylindrical posts 151 and 152, each secured to the top of frame 9 by a screw 153 (see Figs. 5 and 6). A bar 154 joins the tops of posts 151, 152. Each post 151, 152 is mounted eccentrically on its screw 153; thus by appropriately rotating them, any looseness of bar 148 between them can be eliminated. The idler 4 is urged resiliently toward the right, into the driving position of Fig. 2, by the aid of a tension spring 156, one end of which is secured to the pivoted link 149, the other end being anchored to a post 157 on carriage 9. When it is desired to disconnect the drive to the table 1 bar 148 is moved toward the left, assuming the position of Fig. 3.

Convenient means are provided for lifting the recording stylus 12 from the record 2, as well as to stop rotation of the turntable 1, and disengage the feed nut 120 from the feed screw 7. Thus, the position of the recorder on the record may be adjusted. Alternatively, it is possible to maintain the recording stylus 12 free of the record, while the turntable rotates, as for example when it is desired to operate a playback mechanism hereinafter described.

This control mechanism will now be described. As best shown in Figs. 8, 20, 21 and 24, a vertical shaft 160 is rotatably supported on pintles 161, 162 within column 90. This shaft carries a pair of crank arms 163, between which is pivotally mounted a clevis 164. A connecting rod 165 is in turn pivotally attached at one end to clevis 164 and at the other end to crank 83 which as heretofore described, is mounted on the end of the cam shaft 65 (Figs. 20, 25). Thus when crank 83 is rotated by movement of lever 66, rotation is imparted to shaft 160.

When lever 66 is in the forward horizontal position of the drawings, the recorder stylus 12 is in contact with the record, as previously described, and crank 83 is perpendicularly upward with respect to lever 66. When lever 66 is moved through 90° to raise the recorder head, crank 83 by means of the described connections swings shaft 160 in a clockwise direction about its axis. Shaft 160 carries a lever 166 (Figs. 8, 21, 24) near its lower end to which is pivoted one end of a link 167. The other, or left hand end, of link 167 operates a lever 168 pivoted on a post 169 on the top of frame 9. The free end of lever 168 is arranged to cooperate with a stop 170 secured to the top of bar 148 (see also Figs. 2 and 3). This stop may conveniently be a circular disc secured eccentrically to bar 148 by a screw 171.

By loosening screw 171, disc 170 may be rotated about the screw as a pivot, thus providing appropriate clearance between disc 170 and lever 168 to insure free engagement of idler 4 between roller 5 and turntable 1 in response to spring 156. Disc 170 and lever 168 with associated parts form in effect a lost motion connection between lever 66 and bar 148. Furthermore sufficient clearance must be provided to ensure that the record stylus 12 is clear of the surface of record 2 before the idler 4 is moved out of driving engagement.

It is necessary that this movement of thumb lever 66 also disengage feed nut 120 from feed screw 7. In order to accomplish this, shaft 160 carries another crank 173 to which one end of a link 174 is connected. The opposite end of link 174 is slidably supported in a bracket 175 carried by frame 9 (see Figs. 9-11). The free extremity of link 174 is bent up as indicated by 176 in Fig. 11 so as to engage and rotate crank 132 in response to outward axial movement of link 174, caused by rotation of shaft 160. Rotation of crank 132 in turn rotates shaft 125 and feed nut 120, causing arms 121, 122 to swing out of engagement with feed screw 7. Thus movement of thumb lever 66 through 90°, first lifts the recording stylus 12 from the record surface, then stops rotation of the turntable 1, and finally frees the nut 123 from the feed screw 7.

However, in the event that the reproducer is to be used to play back the record, the turntable must be rotated while the recorder stylus is raised, and since (as hereinafter described) the recorder and reproducer are interlocked so that the movement of the recorder transverse to the record is relied on to produce similar transverse movement of the reproducer, the feed nut 120 must be maintained in engagement with feed screw 7 even when the recorder stylus 12 is raised. To accomplish this purpose, means are provided to return the shaft 160 to its initial position while maintaining the recorder raised.

Referring to Fig. 22, it will be noted that cam 67 has a circular portion 180 of substantial angular extent. Thus, further clockwise movement after the initial 90° of movement necessary to raise the recorder will maintain the recording stylus 12 out of contact with the record surface, and additional cam movement of 90° or more can readily be provided for.

Furthermore, 180° of movement by crank 83 will place it in a diametrically opposite position to that shown and this will return shaft 160 to its initial position. Accordingly, when it is desired to change from the recorder to the reproducer, thumb lever 66 is swung through 180° from the position shown, which lifts the recorder stylus 12 out of contact with the record 2 and disengages and reengages the idler 4 and the feed mechanism 7, 120.

The reproducer or playback head 14 is arranged to traverse the record 2 in a direction transverse to the direction of movement of the recorder 11, and as indicated by arrow 181, Fig. 1.

The reproducer 14 may also be of the electrical type, having a stylus 16, which may be permitted at will to rest upon the record 2 by gravity. Reproducer 14 has a rearwardly extending shank 182 (Figs. 7, 28) adapted to be secured in a tubular mounting arm 183 (see also Figs. 27, 30, 31), which extends through and is rotatably supported in block 184. The face of block 184 has a notch 185 extending diametrically of tube 183, adapted to be engaged by a transverse pin 186 projecting from one side only of tube 183. Pins 187, 188 project from this face, being so arranged by engaging pin 186 as to limit movement of tube 183 to 180°.

A counterweight 190 is secured to the rear end of tube 183 and forms a shoulder 191, between which and block 184 a compression spring 192 is accommodated. Spring 192 acts to urge tube 183 axially in block 184, causing pin 186 to engage notch 185. This serves to maintain the stylus 16 in a plane normal to the record surface. If desired, the head 14 may be lifted slightly and together with tube 183 rotated half a turn about the axis of the tube. This turns the head 14 over with the stylus 16 on top, the pin 186 and notch 185 serving to maintain it in this position, when such operations as replacement or repair of parts may be effected.

Block 184 is mounted for universal movement with respect to supporting frame 195 (Figs. 28, 30, 31), by an inverted T-shaped hanger 196. The vertical leg 197 of this hanger passes through a hole 198 in carriage or frame 195 and is supported therein by a washer 199 and pin 200. The horizontal part 201 of hanger 196 supports block 184 by means of adjustable pintle or bearing screws 202 carried by the block and engaging the ends of part 201. The block 184 and hanger 196 form a freely adjustable universal joint for the reproducer arm assembly, permitting the reproducer stylus 16 to follow any minor vagaries of the record groove.

Carriage 195 is slidably supported on rods 205, 206 of frame 15 (Figs. 26, 27, 28) for movement parallel to the surface of record 2. These rods are mounted in arms 207, 208 secured to the back frame member 22 and overhanging the deck plate 20. A sheet metal cover plate 209 for this described mechanism is supported on arms 207, 208.

Means are provided to move carriage 195 along its supporting rods 205, 206 to cause reproducer 14 to traverse the record. The specific mechanism for this will be described hereinafter.

Figure 27:
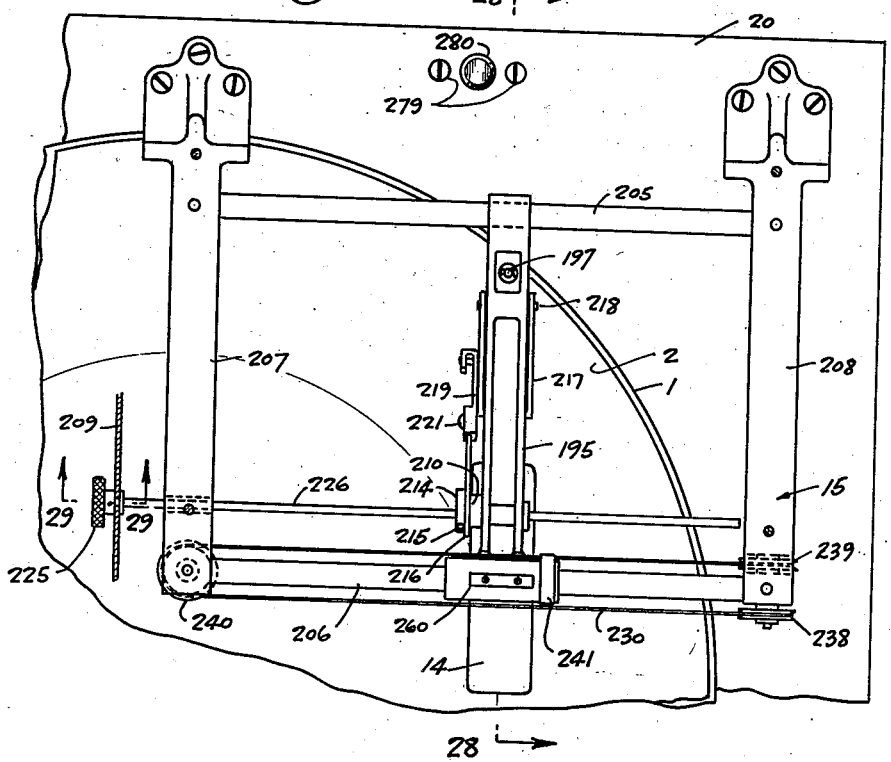
Fig. 27 is a plan view of the structure of Fig. 26 with the protective cover removed, substantially as seen on plane 27—27 of Fig. 26.
Figure 28:
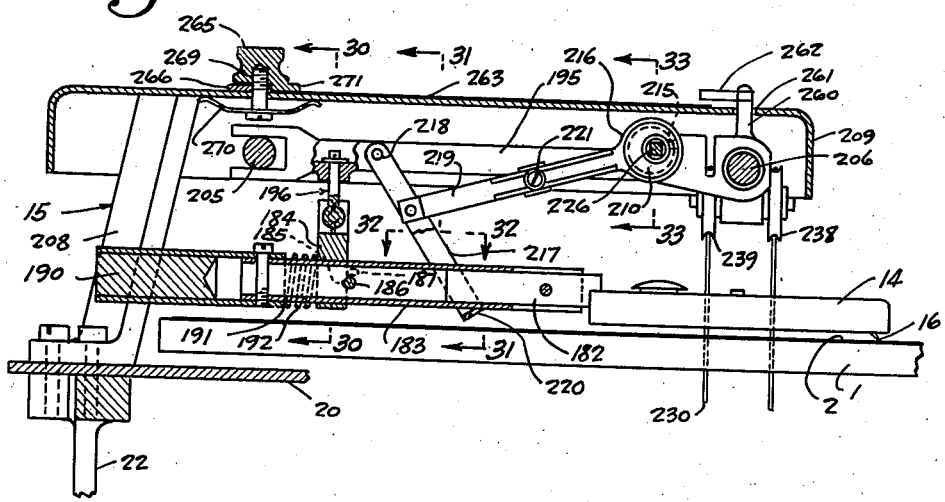

To form a convenient means for lifting reproducing stylus 16 from the record 2 when desired, an eccentric 210 is rotatably mounted on carriage 195 (see Figs. 27, 28 and 33). Thus, a short tube 211 is mounted in suitable bores formed in carriage 195, one end of the tube having a flange 212 and being partially closed by a wall 213. The eccentric 210 has a flange 214 and is secured on the other end of tube 211 as by a set screw 215 so as to retain tube 211 on carriage 195. An eccentric strap 216 engages the eccentric 210.

A U-shaped strap 317 (Figs. 28, 31 and 32) is pivoted at 218 to carriage 195 and loosely embraces tube 183. The eccentric strap 216 has a blade or extension 219 pinned to strap 217. Rotation of eccentric 210 from the position of Fig. 28 will swing strap 217 upwardly about its pivot 218, the strap engaging tube 183 and swinging the reproducer upwardly about pivots 202. Since it is necessary to prevent lateral displacement of the reproducer 14 relative to carriage 195 when it is suspended above the record, the lower end of strap 217 is provided with a deep V-notch 220, the sides of which are adapted to engage tube 183 and hold it against sideward movement.

When strap 217 is in its lower position so that the reproducer stylus 16 supports reproducer 14 on the record, the strap is sufficiently below arm 183, to provide clearance between the arm 183 and notch 220, so that the arm and reproducer may have a certain amount of free lateral movement. To provide for accurately adjusting this clearance the length of eccentric arm 219 is made adjustable, as by forming the arm in two sections adjustably secured together by screw 221.

For conveniently rotating eccentric 210 to raise or lower reproducer 14, a knob 225 (Figs. 27, 29) is provided on the exterior of cover 209. Knob 225 is mounted on one end of a shaft 226 which is rotatably supported in the adjacent portions of cover 209. Shaft 226 passes through the end wall 213 of tube 211, so as to be splined therein and supported thereby, provision being made whereby rotation of the shaft 226 will rotate the tube 211 together with the eccentric 210. For example, shaft 226 may be square for almost its entire length, and wall 213 provided with a corresponding square hole.

This reproducer mounting is described and claimed in a copending application filed in the name of George P. Brubaker, on July 5, 1941, Serial No. 401,138, entitled "Stylus head carrier" and assigned to the same assignee as the present application.

The reproducer 14 is made automatically to follow the traversing motion of the recorder 11 by means of a flexible element or cable 230 (see Figs. 2, 8, 15, 26, 27, 28 and 34) to which the reproducer and the recorder are both joined. This element 230 is appropriately guided by suitable pulleys supported on the frame members.

Figure 15:
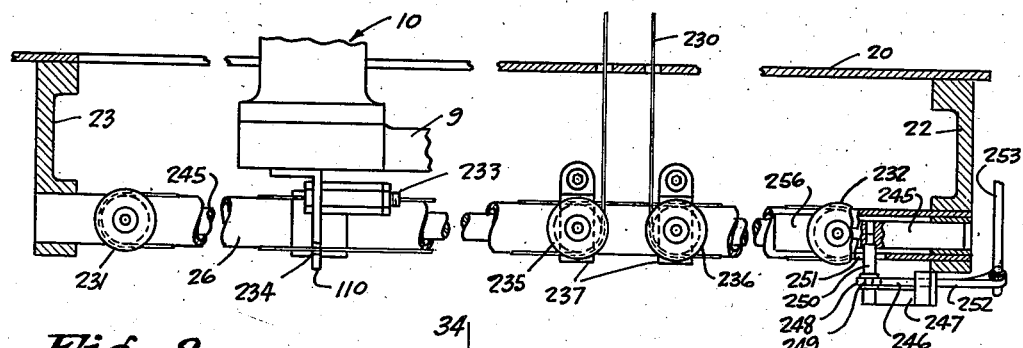
Fig. 15 is a side elevation, partly in section, as seen from the right hand side of Fig. 8 and as indicated by the arrow 15 of Fig. 8.

Thus, guide pulleys 231 and 232 are rotatably supported near the ends of tubular frame member 26 (Figs. 8, 15, 26). These pulleys are movable axially of the tube as will be presently described, but for the present may be considered as fixed. The top reach of element 230 passes between these pulleys, and is secured to carraige 9 by a suitable clamp 233 (Figs. 2, 8, 15) carried on member 110, which connects carriage 9 to the sliding collar 98 (Fig. 16). The lower reach of element 230 passes member 110 freely, a slot 234 being provided for it therein.

The lower reach of element 230 passes from pulleys 231 and 232 respectively to pulleys 235 and 236 (Figs. 8 and 15) which are rotatably supported on rod 26 by brackets 237. Cable 230 passes around pulleys 235 and 236 and upward to similar pulleys 238 and 239 (Figs. 26, 27, 28), rotatably supported in the end of arm support 208. Element 230 passes from pulley 238 parallel with rod 206 passing freely in front of carriage 195 to a pulley 240 mounted in the end of arm 207; thence from pulley 240 along the rear of bar 206 to pulley 239, being secured to carriage 195 in any convenient way as by a suitable clamp 241. Thus, as frame 9 carries recorder 11 transversely of the record, a movement in the same sense and equal in amount is imparted to reproducer 14.

It may be desirable to vary the distance relative to the record groove by which the reproducer 14 follows the recorder 11. It is possible to make such adjustment by appropriate manipulation of clamp 233, or clamp 241, but a simpler and more accurate method is desirable. One way in which such lag can be varied will now be described.

By referring to Figs. 8, 15, and 34, it will be seen that the pulleys 231 and 232 are mounted on a bar 245 which is axially slidable in member 26, the axial position of this bar serving to determine the relative positions of recorder 11 and reproducer 14. This mounting is effected by the aid of bearing pins for the pulleys, extending through slots in the tubular guide 26, and fastened to bar 245.

Referring to Fig. 36, which shows the cable arrangement in diagrammatic form, the carriage 9 which carries the recorder 11 may be considered as fixed. Then if pulleys 231 and 232 are given an adjusting movement to the dotted position, element 230, except its upper reach which is held against movement by carriage 9 will move as indicated by the arrows, carrying carriage 195 with reproducer 14 with it. Such movement will be double the amount of movement given the pulleys. This movement between members 9, 11 and 195, 14 is entirely relative and will occur regardless of whether or not either member is stationary or both move.

A convenient mechanism for adjusting bar 245 is shown in Figs. 8, 15, 34 and 35. Thus, a bell crank 246 is pivotally supported on a bracket 247 attached to frame 22. One arm 248 has a slot 249 for receiving a pin 250 depending from rod 245 and passing through a slot 251 in the bottom of tube 26. The other arm 252 of bell crank 246 is connected by a link 253 on operating lever 254, carried by a bracket 255. This lever 254 extends through a suitable opening in the deck plate 20. It will be readily apparent that appropriate manipulation of lever 254 will alter the position of bar 245 and vary the lag of the reproducer 14 with respect to recorder 11. To provide a frictional restraint for maintaining the desired adjustment, a leaf spring 256 is carried by pin 257 which supports pulley 232. This spring is bowed so that its ends bear against the outside of tube 26 with appreciable force, thus exerting a frictional restraint against the movement of pin 257, bar 245, etc. relative to tube 26. Appropriate end supports are provided for the shift bar 245, as indicated in Figs. 8 and 15, whereby this bar is maintained in proper coaxial relationship with tubular guide 26. An appropriately graduated plate 258 (Fig. 1) may be provided on deck plate 20 adjacent lever 254 to facilitate adjusting the lag.

By appropriate setting of the lag of reproducer 14 it is possible to reproduce the immediately preceding recorded matter at any time by simply lifting the recorder 11, and by dropping reproducer 14 to active position. Then by appropriate electrical switching, the reproducer 14 may be placed into electrical operation. During recording the reproducing head 14 may be raised by appropriate manipulation of the knurled knob 225.

It may be required to make it possible to set the reproducer 14 so that it complies with a desired portion of the record disc 2. Logging cards may be used for this purpose, upon which may be indicated the material that is recorded. Thus for example the reproducer carriage 195 may have a projection 260 (Figs 26, 27 and 28) extending through a slot 261 in the cover member 209. Attached to the projection 260 may be a pointer 262. This pointer is intended to traverse a card 263 (Figs. 1 and 28). This card 263 is shown as provided with graduations 264 cooperating with the pointer 262 and corresponding to accurate time intervals of the record. Opposite these graduations may be appropriate identifying matter to indicate what is recorded adjacent these graduations on the record corresponding to the card in use.

The card 263 may be utilized, during the process of recording, for notations of the recorded material, since the pointer 262 also corresponds to the position of the recorder 11.

The card 263 may be held appropriately in place on cover member 209 (Figs. 1 and 28) as by the aid of a spring pressed button 265.

A thin strip 266 (Fig. 1) as of fibre or the like and having a corner piece 267 is secured to the top of cover member 209 as by screws 268 in such position as to accurately locate the log card 263 with respect to pointer 262. The button 265 as clearly shown in Fig. 28 is held in place by a screw 269 extending downwardly through a suitable hole in cover 209 and strip 266. A leaf spring 270 carried by screw 269 and having its ends bent upwardly to engage the under side of cover 209 urges the button downwardly. Button 265 has a projecting lip 271 adapted to engage the log card 263 and retain it in place.

When it is desired to place a card in position for use, button 265 is raised slightly, the card inserted until it encounters stops 266—267, and the button then released to permit lip 271 to engage the card.

It may be desirable to provide means restraining the carriage 9 against movement, as for example when the phonograph is to be moved or shipped. One form which such means may take is shown in Figs. 8, 18 and 19. A flat spring 275 is secured to the top of carriage 9 as by screws 276 and projects beyond the carriage, having a hole 277 near its outer end. A block 278 is secured to the underside of deck 20 immediately adjacent frame 22 in any convenient manner, as by screws 279. A retaining pin 280 is movable vertically through block 278 and is adapted to enter hole 277. A ball 281 is urged by a spring 282 into engagement with either of two annular grooves 283 formed in the surface of pin 280, and acts as a detent to releasably maintain the pin in an upper or lower position. In its upper position as shown, it is of no effect; in its lower position however, it will enter hole 277 when carriage 9 is near one limit of its movement and hold the carriage against further movement in either direction.

What is claimed is:

1. In a drive mechanism for a phonograph having a rotatable record supporting table and a head adapted to cooperate with the record, a cylindrical member having an axis normal to the axis of rotation of the table, means for rotating said member, a drive wheel adapted to transmit a rotary force from the member to the table, a carriage for the head, upon which carriage the wheel is supported, motion transmitting mechanism connecting the table and the carriage, to cause the carriage to traverse the table in response to rotation of the table, and means resiliently urging said wheel into driving relation to the member and the table.

2. In a drive mechanism for a phonograph, having a rotatable record supporting table, a rotary member, a wheel adapted to contact both the table and the rotary member for causing the table to rotate, means resiliently urging said wheel into driving position, and means for positively urging said wheel out of driving relation.

3. In a drive mechanism for a phonograph having a rotatable record supporting table and phonic means adapted to cooperate with the record, a cylindrical drive roller having an axis normal to the axis of rotation of the table, an idler adapted to transmit rotary motion from the roller to the table, a carriage for the head, motion transmitting mechanism connecting the table and the carriage, whereby rotation of the table causes said carriage to traverse the table, a support on the carriage for said idler, said support comprising a movable bar, a link pivoted near one of its extremities to the carriage and pivotally joined near its other extremity to said bar, for confining movement of said bar in a plane substantially normal to the axis of said roller; and a resilient member acting on the bar to urge the idler into driving relation between the driving roller and the table.

4. In a drive mechanism for a phonograph having a rotatable record supporting table and phonic means adapted to cooperate with the record, a cylindrical drive roller having an axis normal to the axis of rotation of the table, an idler adapted to transmit rotary motion from the roller to the table, a carriage for the head, motion transmitting mechanism connecting the table and the carriage, whereby rotation of the table causes said carriage to traverse the table, and a support for said idler, including a link pivoted on the carriage for movement in the plane of rotation of the idler.

5. In a drive mechanism for a phonograph having a rotatable record supporting table, a drive roller, an idler adapted to contact both the table and the drive roller for causing the table to rotate, means resiliently urging the idler into driving relation with the roller and the table, and a support for the idler, said support serving to restrict axial movement of the idler but allowing it to move freely normally to the axis of rotation into engagement with the said roller and table.

6. In a drive mechanism for a phonograph having a rotatable record supporting table, a drive roller, a floating idler between the roller and the table, means restricting movement of said idler to movement normal to its axis of rotation, and means resiliently urging said idler to move into engagement with said roller and said table.

7. In a drive mechanism for a phonograph having a rotatable record supporting table and phonic means adapted to cooperate with the record, a cylindrical drive roller having an axis normal to the axis of rotation of the table, an idler adapted to transmit rotary motion from the roller to the table, a carriage for the head, motion transmitting mechanism connecting the table and the carriage, whereby rotation of the table causes said carriage to traverse the table, a support for said idler, said support comprising a bar on which the idler is pivotally mounted, a link pivotally secured to the carriage as well as to the bar and an adjustable guide on the carriage for the bar, comprising means defining an adjustable slot through which the bar is slidable.

8. In a phonograph, a record support, means for driving said support, a recording head for cooperating with a record on said support, means for moving the head to traverse the record, means for lifting the head out of operative relation with the record, means for disconnecting the driving means from said support, and common means movable continuously in one direction for operating said lifting means and said disconnecting means in sequence.

9. In a phonograph, a record support, means for driving said support, a head for cooperating with a record on said support, means for moving the head to traverse the record, means for lifting the head out of operative relation with the record, means for rendering the traversing means ineffective including a rotatable shaft, and common means movable continuously in one direction for operating said lifting means and including a connection to said shaft, whereby operation of the common means causes rotation of the shaft and renders the traversing means ineffective.

10. In a phonograph, a record support, means for driving said support, a head for cooperating with a record on said support, means for moving the head to traverse the record, means for lifting the head out of operative relation with the record, a rotatable shaft, means for disconnecting the driving means from said support, upon rotation of said shaft, including means forming an operating connection with the shaft means for rendering the traversing means ineffective upon rotation of said shaft, including means forming another operating connection with the shaft, and common means movable continuously in one direction for operating said lifting means, and including a connection with said shaft, whereby operation of said common means causes rotation of said shaft.

11. In a phonograph, a record support, means for driving said support, a phonic head for cooperating with a record on said support, means for causing the head to traverse the record, means for lifting the head out of cooperative relation with the record, means for rendering the traversing means ineffective, and common means movable continuously in one direction for operating the lifting means and the means for rendering the traversing means ineffective, said common means including a connection to the traversing means, movable through a complete connecting and disconnecting cycle upon continuous movement of said common means, for lifting the head and controlling the traversing mechanism.

12. In a phonograph, a record support, means for driving said support, a phonic head for cooperating with a record on said support, a pivotal support for the head, means for causing the head to traverse the record, means for lifting the head out of cooperation with the record including a rotatable shaft, as well as a cam carried by the shaft and having a high portion of greater than 90° extent, means for controlling the traversing means including a crank arm on said shaft, and a connection from the crank to the controlling means, said crank arm being so alined with respect to the high portion of the cam that rotation of the shaft to move the cam to initial head lifting position will cause the crank to operate said control means to render the traversing means ineffective, and continued rotation of the shaft will cause the cam to maintain the head lifted and move the crank to operate said control means to render the traversing means effective.

13. In a phonograph, a record support, means for driving said support, a phonic head for cooperating with a record on said support, means for causing the head to traverse the record, means for lifting the head out of cooperative relation with the record, mechanism for disconnecting the driving means from said support, and means for operating the lifting means and the disconnecting means in sequence, comprising a commonly rotatable cam and crank, and a connection from said crank to the disconnecting means, said crank being so arranged with respect to said connection that the driving means is disconnected at an intermediate point of the travel of the crank, and is connected at either extremity of the travel of the crank.

14. In a phonograph, a record support, means for driving said support, a phonic head for cooperating with a record on said support, means for causing the head to traverse the record, means for lifting the head out of cooperative relation with the record, mechanism for disconnecting the driving means from said support, as well as for rendering the traversing means ineffective, a cam for operating the lifting means, and a crank for operating the said mechanism, said cam and said crank being arranged for simultaneous rotation, said mechanism including connections respectively to the traversing means and to the driving means, whereby the drive means is disconnected and the traversing means is rendered ineffective, said connections being so arranged with respect to the crank that said drive means is disconnected and said traversing means is rendered ineffective only at an intermediate point in the rotation of the crank.

15. In a phonograph, a record support, means for driving said support, a phonic head for cooperating with a record on said support, means for causing the head to traverse the record, means for lifting the head out of cooperative relation with the record, mechanism for disconnecting the driving means from said support, as well as for rendering the traversing means ineffective, a rotatable member for operating the lifting means and said mechanism, and an indicator actuated by said member for indicating when the driving means is disconnected and the traversing means disconnected.

16. In a phonograph, a rotatable support, a record on said support, a phonic head having a stylus adapted to engage the record, an arm pivotally supported above said record and carrying the head and arm at its outer end, said head moving toward the record in response to gravity, a stop for limiting the downward movement of said arm about said pivotal support, means, including a resilient member, pivotally securing the head to said arm, means opposing rotation of the head about said second pivot, whereby the head and arm normally move as a unit about the first pivot, and means to overcome the force exerted by the resilient member, for causing the head to move about said second pivot to lift the stylus out of engagement with the record.

17. In a phonograph, including a record, as well as a recorder and a reproducer for cooperating with the record, movable carriages respectively carrying the recorder and the reproducer, means for moving one of said carriages, guide means for said carriages arranged to guide the movement of the reproducer at an angle with the movement of the recorder, a flexible element connecting the carriages for simultaneous movement, and means to alter the relative positions of the recorder and reproducer with respect to the record, comprising a pair of pulleys over which said element passes, an adjustable support for said pulleys, and means to adjust the position of said support with respect to said carriages.

18. In a phonograph, including a record, as well as a recorder and a reproducer for cooperating with the record, movable carriages respectively carrying the recorder and the reproducer, means for moving one of said carriages, guide means for said carriages arranged to guide the movement of the reproducer at an angle with the movement of the recorder, a flexible element connecting the carriages for simultaneous movement, and means to alter the relative positions of the recorder and reproducer with respect to the record, comprising a pair of spaced pulleys, said flexible element extending about said pulleys, means connecting one of said carriages to one reach of the element, means connecting the other carriage to the other reach of the element, a movable support for said pair of pulleys, and means to move said support in the direction of movement of one of said carriages, whereby one of said reaches is moved with respect to the other reach.

19. In a phonograph, including a record, as well as a recorder for cooperating with the record, a guided movable carriage carrying the recorder, means for moving said carriage, a reproducer for cooperating with the record, a second carriage for the reproducer, guide means for said second carriage arranged to guide the movement of the reproducer at an angle with the movement of the recorder, a flexible element connecting the carriages whereby motion of the recorder produces a corresponding motion of the reprdoucer, and means to alter the relative positions of the recorder and reproducer with respect to the record, comprising a longitudinally movable bar, means to guide said bar for movement in the direction of movement of one of the carriages, a pair of pulleys rotatably supported on the bar, one adjacent each end thereof, a fixed pair of pulleys supported intermediate the movable pulleys, one reach of the flexible element passing between the movable pulleys, means securing one of said carriages to said reach, the other reach passing over the fixed pulleys and being secured to the other carriage at a point between them, and means to move the bar.

20. In a phonograph having a pair of phonic devices arranged for simultaneous cooperation with a record, means for causing one of said devices to traverse the record, means cooperating to guide the other device in a direction to traverse the record, a flexible element connecting said devices whereby movement of said one device is imparted to the other device, a pair of pulleys about which said element passes, said devices being connected respectively to the opposite reaches of said element, and means to adjust the position of said pair of pulleys with respect to one of said devices and in the direction of movement of said one device, whereby the relative position of said devices is altered with respect to the record, said means comprising a movable member upon which said pair of pulleys is mounted.

21. In a phonograph, a record support, means for driving said support, a recording head for cooperating with a record on said support, means for moving the head to traverse the record, means for lifting the head out of operative relation with the record, means including a lost motion connection for disengaging the driving means from said support, and a common means movable continuously in one direction for operating said lifting means and said disconnecting means, said lost motion connection ensuring that the head is freed from the record before the driving means is disengaged.

FRANK RIEBER.